US011405530B1

(12) United States Patent
Morales

(10) Patent No.: US 11,405,530 B1
(45) Date of Patent: Aug. 2, 2022

(54) METHODS AND SYSTEM FOR MANAGING COLOR MANAGEMENT RESOURCES

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/218,627

(22) Filed: Mar. 31, 2021

(51) Int. Cl.
*H04N 1/60* (2006.01)
*H04N 1/00* (2006.01)
*H04N 1/407* (2006.01)
*G01J 3/52* (2006.01)

(52) U.S. Cl.
CPC ....... *H04N 1/6044* (2013.01); *H04N 1/00087* (2013.01); *H04N 1/4078* (2013.01); *G01J 3/524* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,696,889 A | * | 12/1997 | Morikawa | H04N 1/4078 358/1.9 |
| 7,064,860 B1 | * | 6/2006 | Balasubramanian | H04N 1/6008 358/1.9 |
| 7,155,068 B2 | | 12/2006 | Zhang et al. | |
| 10,409,529 B2 | * | 9/2019 | Yano | H04N 1/6044 |
| 11,323,593 B1 | * | 5/2022 | Morales | G06F 3/1204 |
| 2002/0085234 A1 | * | 7/2002 | VanDuyn | H04N 1/407 358/3.06 |
| 2003/0090532 A1 | * | 5/2003 | Piatt | H04N 1/407 347/5 |
| 2004/0207862 A1 | | 10/2004 | Such et al. | |
| 2008/0247770 A1 | * | 10/2008 | Morales | G03G 15/5062 399/49 |
| 2009/0009766 A1 | * | 1/2009 | Bonino | G01J 3/02 356/402 |
| 2009/0033957 A1 | * | 2/2009 | Hardy | H04N 1/6033 358/1.9 |

FOREIGN PATENT DOCUMENTS

JP  2003046794 A  *  2/2003

* cited by examiner

*Primary Examiner* — Barbara D Reinier
(74) *Attorney, Agent, or Firm* — Millen, White, Zelano & Branigan, P.C.; William Nixon

(57) ABSTRACT

A color printing system includes a color management server and one or more printing devices. The color management server manages color printing resources among the printing devices. A test chart is printed at a printing device and used to capture calibration measurement data. Calibration settings are defined for the calibration measurement data. A tone reproduction curve (TRC) is generated based on the calibration measurement data and the calibration settings. The TRC is stored with the TRC settings and calibration measurement data to be used at a printing device. The TRC settings are edited and the TRC associated with the measurement data is updated or regenerated to reflect the edited settings. More than one TRC is updated with the new settings if it uses the measurement data.

16 Claims, 7 Drawing Sheets

METHODS AND SYSTEM FOR MANAGING COLOR MANAGEMENT RESOURCES

FIELD OF THE INVENTION

The present invention relates to managing color management resources by retaining metadata about these resources that enables interactions between the resources, including calibration tone reproduction curves (TRCs) and ICC profiles.

DESCRIPTION OF THE RELATED ART

Color management is one of the more complex aspects of color printing. Two operations may be performed for production print color management, calibration and ICC profile creation. In color management, an ICC profile is a set of data that characterizes a color input or output device, or a color space, according to standards promulgated by the International Color Consortium (ICC). Calibration provides a stable foundation on which ICC profiling can be implemented. Calibration may be relatively straight-forward as opposed to ICC profile creation. Calibration linearizes color printing device response so that individual color ramps, or colors in 10% increments from 10%-100%) are evident.

Color management for production printing results in the creation and management of color management resources, such as the calibration TRCs and ICC profiles. A printing device color reproduction response drifts over time, it may be a challenge to ensure that all of the color management resources remain valid and able to produce the expected results. For example, a print shop may use 5 different ink limits for each paper that is profiled. If the ICC profiles become invalid because the printing device color reproduction response has changed over time, then the print shop prints targets and measures all of the ICC profiles for all of their papers. This number quickly can become unwieldy. For example, if the print shop chooses to calibration just 10 papers using 5 different ink limits, then the shop would have to manage 50 ICC profiles.

SUMMARY OF THE INVENTION

A method for managing color management resources is disclosed. The method includes defining calibration settings for at least one printing device. The calibration settings are associated with calibration measurement data. The method also includes generating at least one calibration tone reproduction curve (TRC) having TRC settings using the calibration settings and the calibration measurement data. The method also includes storing the at least one calibration TRC having the TRC settings and the calibration measurement data for the at least one printing device. The method also includes editing the TRC settings associated with the calibration measurement data. The method also includes updating the at least one calibration TRC based on the TRC settings. The method also includes applying the at least one calibration TRC when processing a print job at the at least one printing device.

A method for managing color printing resources is disclosed. The method includes defining calibration settings. The calibration settings are associated with calibration measurement data captured at a printing device. The method also includes generating a first calibration tone reproduction curve (TRC) having TRC settings using the calibration settings and the calibration measurement data. The method also includes storing the first calibration TRC having the TRC settings and the calibration measurement data. The method also includes editing the TRC settings associated with the calibration measurement data. The method also includes generating a second calibration TRC based on the edited TRC settings. The second calibration TRC is associated with the edited TRC settings and the calibration measurement data. The method includes applying the second calibration TRC when processing a print job at the printing device.

A color management server for a printing system is disclosed. The color management server is configured to define calibration settings for at least one printing device within the printing system. The calibration settings are associated with calibration measurement data. The color management server also is configured to generate at least one calibration tone reproduction curve (TRC) having TRC settings using the calibration settings and the calibration measurement data. The color management server also is configured to store the at least one calibration TRC having the TRC settings and the calibration measurement data for the at least one printing device. The color management server also is configured to edit the TRC settings associated with the calibration measurement data. The color management server also is configured to update the at least one calibration TRC based on the TRC settings. The color management server also is configured to send the at least one calibration TRC to the at least one printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet. Control strip—a test color strip that also contains encoded information.

Target print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments allow more intelligent management of color resources within a printing system. The disclosed embodiments retain metadata about color management resources that may be used to provide more intelligent interactions between color management resources. These features would be enabled for both calibration TRCs and ICC profiles. When calibrating a printing device, the system prints a test chart with colorant ramps. The colorant ramps are used to define the TRC for each colorant as part of known printing device calibration.

When saving the calibration TRCs, the system also will save the raw measurement data. The disclosed embodiments uses this information in a more intelligent manner. For calibration, the calibration data is not only generated but it is retained and persistently associated with one or more TRCs. This feature allows the operator or the system to edit TRC settings at any time, even after calibration is completed. For recalibration, if it is successful, then the disclosed embodiments will use the new measurement data and generate a TRC per calibration behavior. If multiple TRCs are generated, however, from the same measurement data, then the disclosed embodiments will update all TRCs using the same measurement data. Other operations and features are enabled if recalibration fails.

Figure 1:
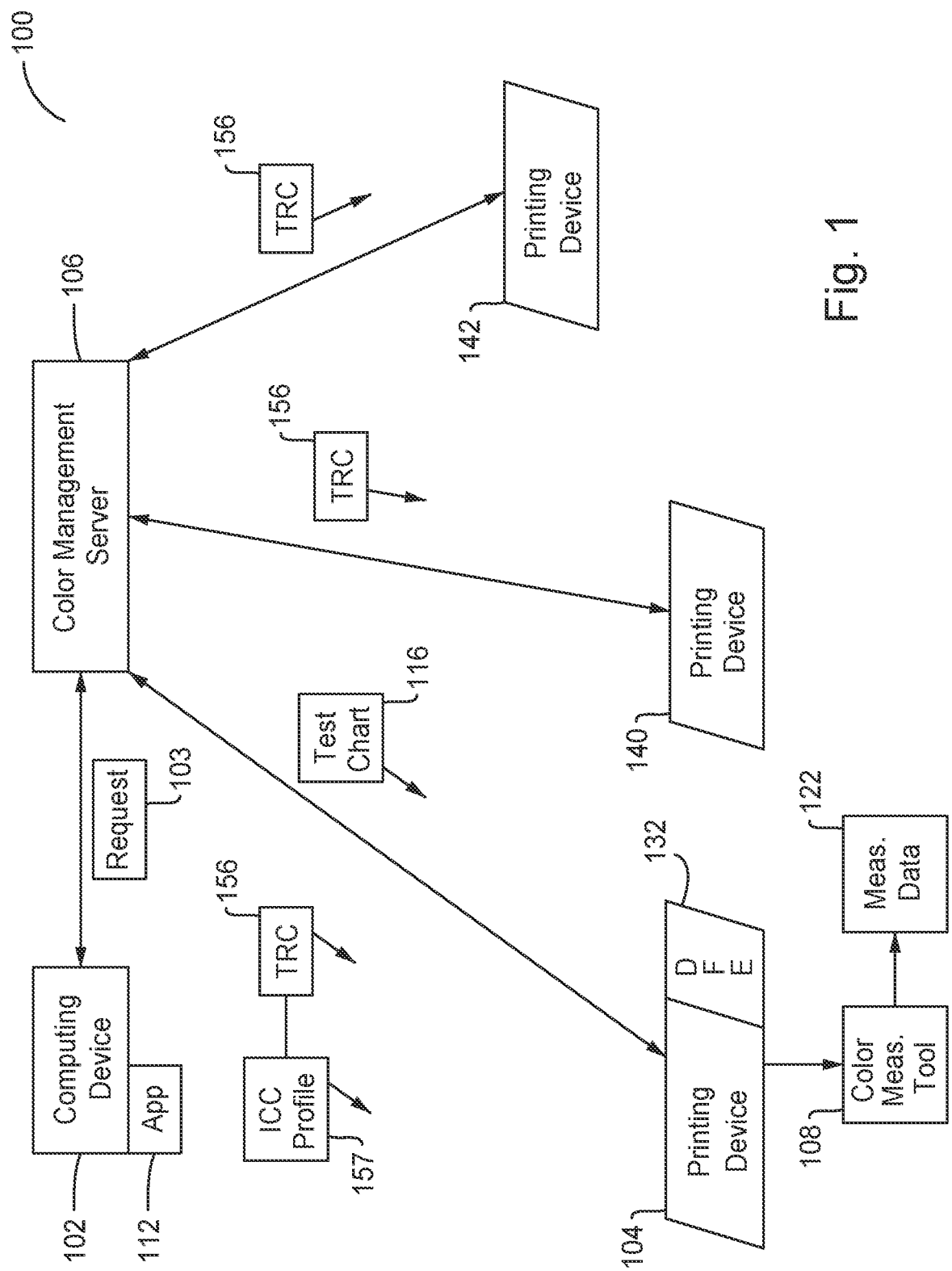
FIG. 1 illustrates a block diagram of a color management system for printing devices according to the disclosed embodiments.

FIG. 1A depicts a color management system 100 for printing devices 104, 140, and 142 according to the disclosed embodiments. Color management system 100 includes a color management server 106. Color management server 106 may be a server that registers all printing devices within system 100 and controls color management operations for the printing devices. In some embodiments, color management system 100 may be a system or network within a print shop having several or more printing devices.

Printing devices 104, 140, and 142 may receive print jobs from color management server 100. They also may receive calibration print jobs and quality checks from color management server 100. Test chart 116 may be generated to perform calibrations, disclosed in greater detail below. Other items and data files may be sent to printing devices 104, 140, and 142. Further, the printing devices may provide data and information to color management server 106 so that it may manage color printing operations within system 100.

In some embodiments, computing device 102 may include an application 112 that generates data for printing that is sent to color management server 106. Color management server 106 also may exchange data with printing device 104 for performing calibration operations, specifically color calibration. Color management server 106 is a server that manages print jobs and tasks between a plurality of printing devices 104, 140, and 142. Color management server 106 also provides calibration operations to the printing devices. An operator may perform calibration tasks for the plurality of printing devices using color management server 106 using computing device 102. In some embodiments, computing device 102 is incorporated with color management server 106.

Preferably, color management server 106 allows for inspection, calibration, and profiling for management of color print jobs. Color management server 106 may act as a software as a service (SaaS) solution that provides color management. The service enables repeatable color reproduction at the printing devices. Color management server 106 also may manage digital front ends (DFEs) from production printing which include paper catalogs. These paper catalogs may include paper measurements and paper color measurement profiles. For example, printing device 104 includes DFE 132.

In some embodiments, an operator may request calibration for printing device 104 within system 100. The user may utilize application 112 on computing device 102 to generate calibration request 103 for printing device 104. Calibration request 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management server 106 receives calibration request 103 within system 100. Color management server 106 generates a test chart 116 to obtain measurement data for the paper at printing device 104. Test chart 116 includes color patches used to perform calibration operations. Test charts 116 may use colorant ramps for each colorant. Test chart 116 is forwarded to printing device 104, which prints it out on the indicated paper/media type. An operator takes test chart 116. The operator may use color measurement tool 108 to measure the color patches on test chart 116 to obtain measurement data 122. Alternatively, printing device 104 may include inline measurement tools that automatically measure the color patches within test chart 116.

The operator or printing device measures calibration chart 116 after it is printed out at the printing device. Measurement data 122 is captured by measuring the color patches and the printed colors associated therewith. The data is provided back to color management server 106 for analysis. Using the measured data, color management server 106 generates calibration tone reproduction curves (TRCs) 156 using calibration settings that may be set by the operator or system 100. Calibration settings may include end point targets and aims for the colors. Once the calibration TRCs 156 are created, they are downloaded to the printing device or devices. Alternatively, if calibration is implemented at the printing device, then calibration TRCs 156 may be stored in digital front end (DFE) 132. In some embodiment, a TRC 156 may be stored in multiple printing devices within system 100. Calibration TRCs 156 also may be associated with ICC profile 157 that is sent to printing device 104. ICC profile 157 may be built upon calibrated output such as measurement data 122.

Figure 2:
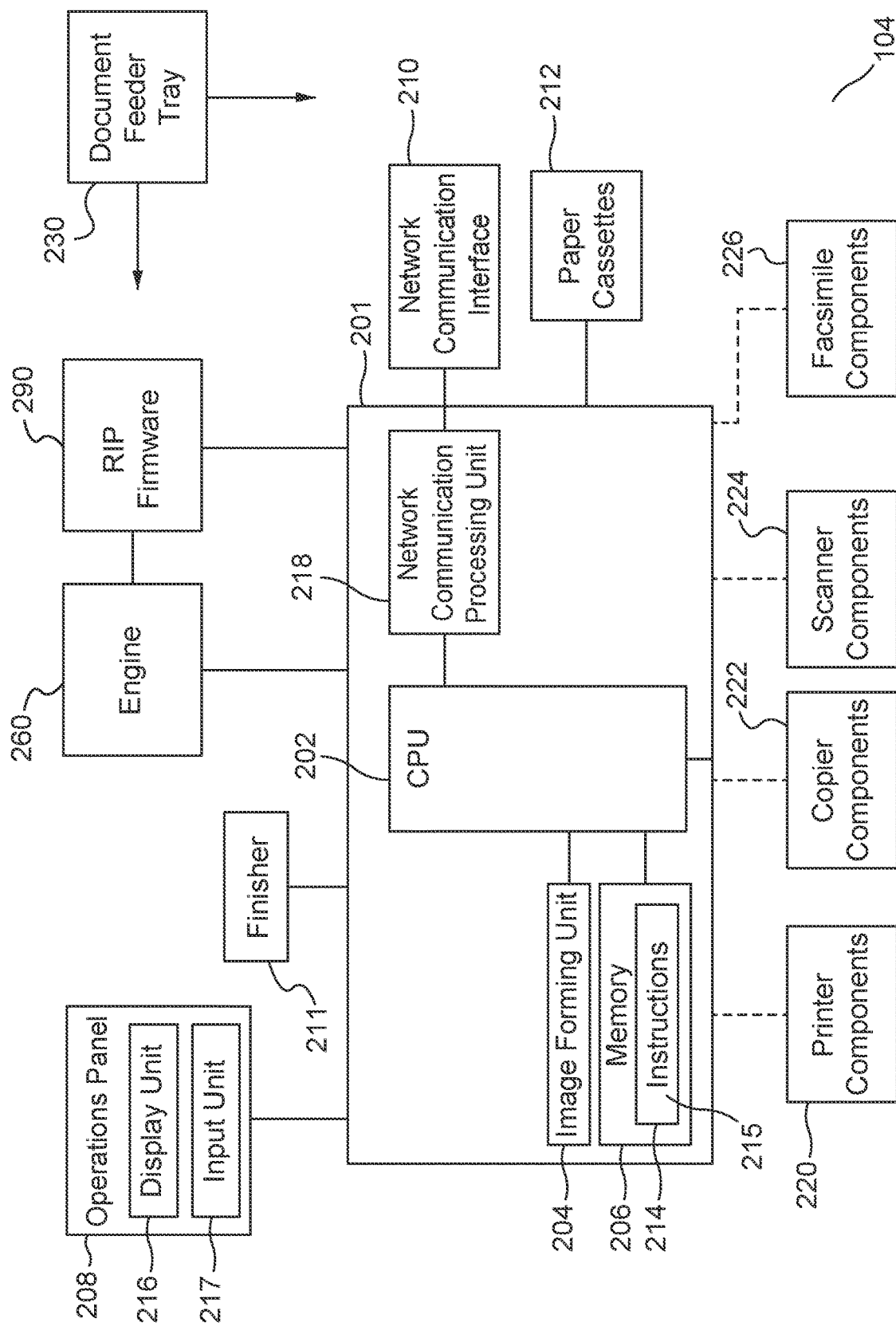
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like.

Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

Figure 3:
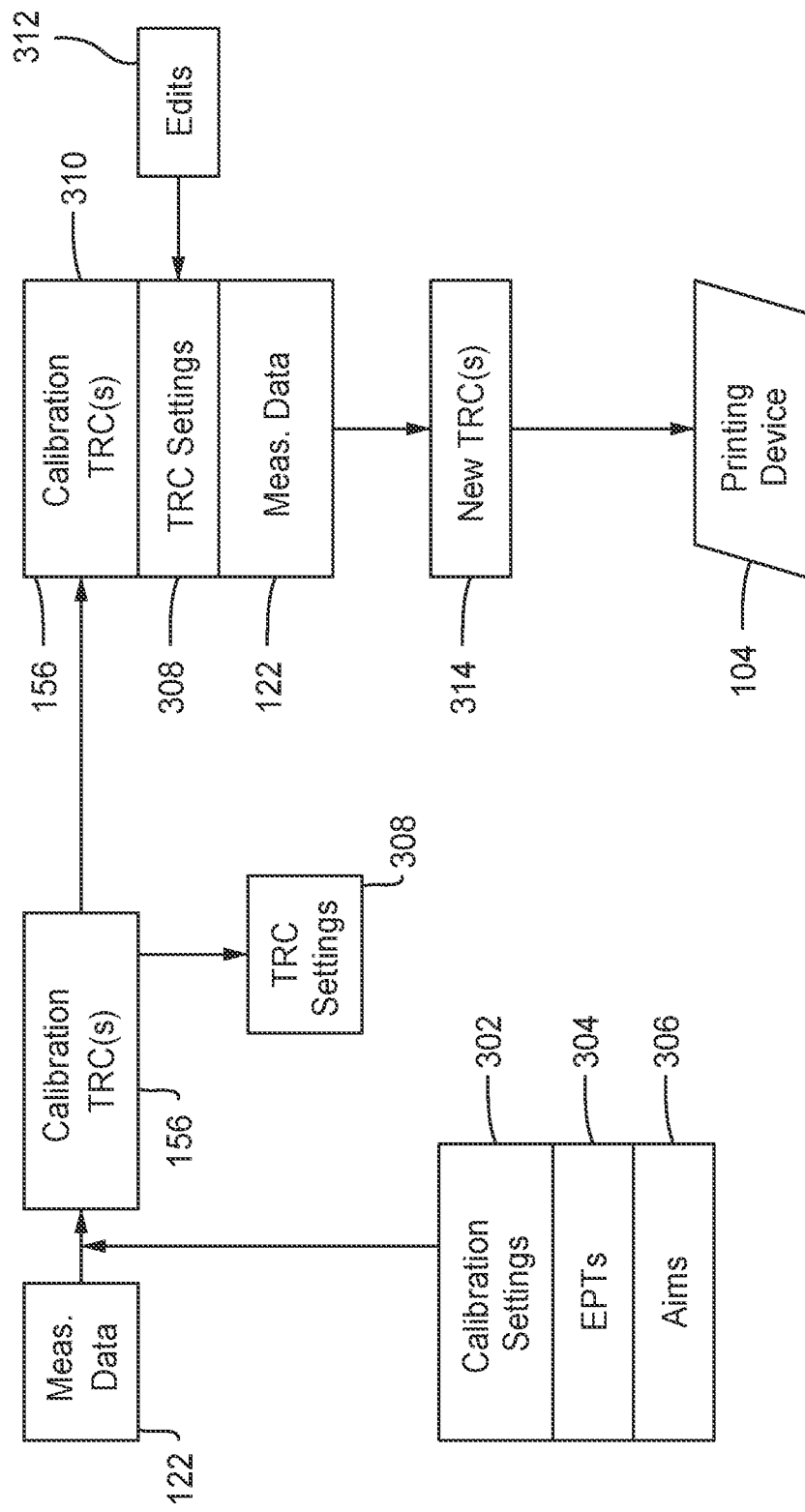
FIG. 3 illustrates a block diagram of data flow for calibration operations using stored data about color management resources according to the disclosed embodiments.

FIG. 3 depicts a block diagram of data flow for calibration operations using stored data about color management resources according to the disclosed embodiments. Calibration is a process that enables an operator to measure the output of printing device 104 against test chart 116. The process allows system 100 to adjust for "drift" in the color response of the printing device to achieve consistent results. As disclosed above, calibration measurement data 122 is captured using test chart 116 at printing device 104 as well as other printing devices in system 100. Calibration settings 302 may be defined for measurement data 122. Calibration settings 302 include end point targets 304 and aims 306. End point targets 304 relate to the specified maximum densities for colors in printing to a paper media. Aims 306 relate to the dot gain to achieve desired colors for color printing.

Calibration settings 302 are used in conjunction with measurement data 122 to generate calibration TRCs 156. A TRC 156 may be used by color management server 106 or printing device 104. Calibration settings 302 also may be changed or updated to modify a calibration TRC 156 or create a new one. TRC settings 308 also are generated. TRC settings 308 relate to calibration settings 302 except that they associated with the generated TRC(s). TRC settings 308, therefore, may include end point targets and aims to generated calibration TRCs 156.

Calibration TRCs 156, TRC settings 308, and measurement data 122 associated with generated the TRCs are stored together as a calibration data set 310. Calibration data set 310 may include other information, such as applicable printing devices for the calibration TRCs. Calibration data set 310 may be stored at color management server 106 for use when color printing to those devices that utilize the respective TRCs 156. Alternatively, calibration data set 310 may be stored at printing device 104 or other printing devices. Measurement data 122 is retained and persistently associate with calibration TRCs 156.

According to the disclosed embodiments, edits 312 may be made to TRC settings 308. Edits 312 may be made at any time, even after calibration. An operator may edit TRC settings 308, such as calibration settings 302, after printing test chart 116. When measurement data 122 is received, the disclosed embodiments may generate new calibration TRCs 314 with the updated settings. The operator also may edit TRC settings 308 after they have been created and associated with generated calibration TRCs 156 within calibration data set 310 to generate new calibration TRCs 314.

TRC settings 308 also may receive edits 312 for calibration TRCs 156 already installed at printing device 104. Color management server 106 may find measurement data 122 and use it to generate new or updated calibration TRCs 314. Color management server 106 may then push new calibration TRCs 314 to printing device 104, as well as other printing devices stored calibration data set 310 or measurement data 122. This process also may be performed in printing device 104 then pushed to other components within system 100.

Figure 4:
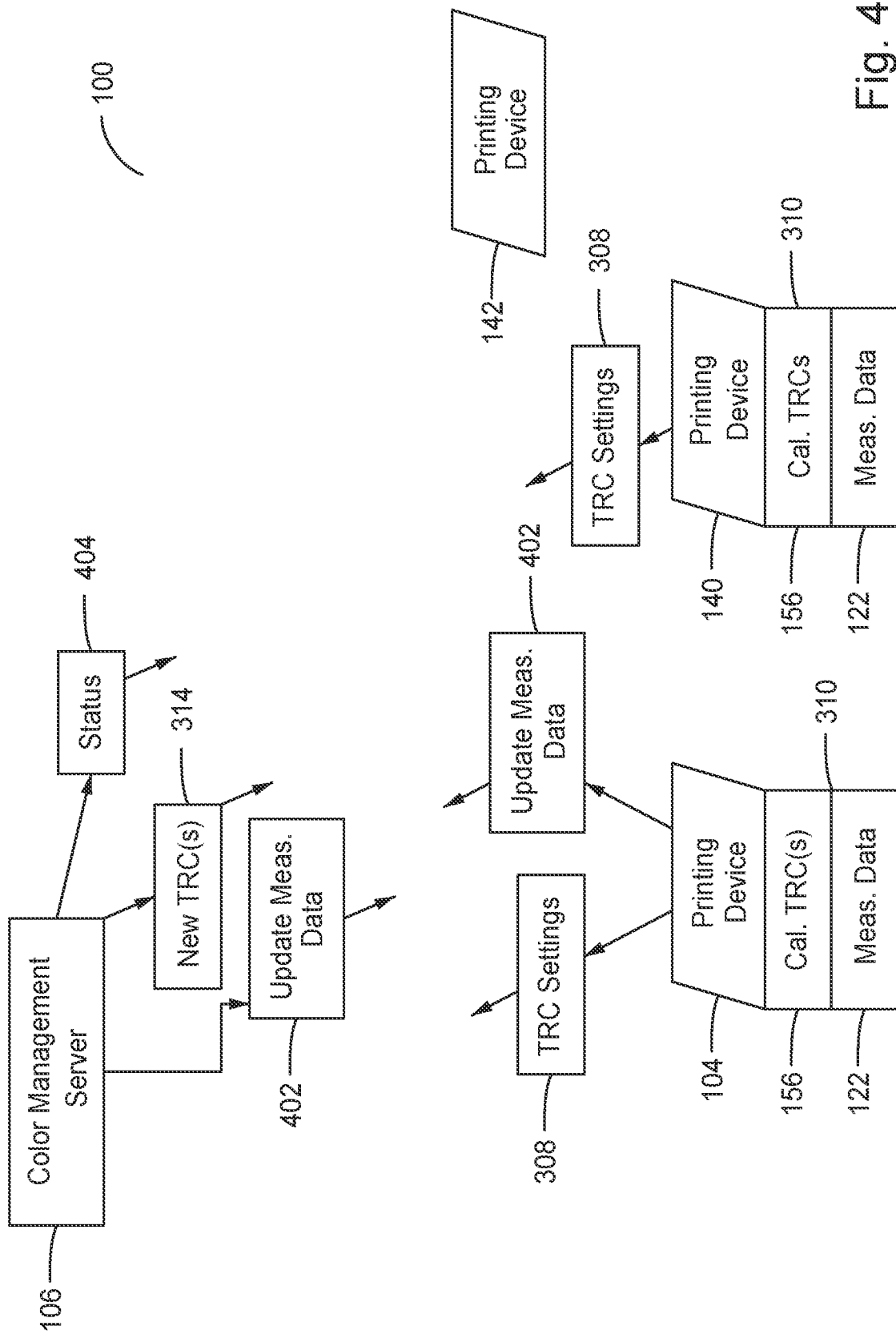
FIG. 4 illustrates a block diagram of data flow for generating and implementing new calibration TRCs for recalibration operations according to the disclosed embodiments.

FIG. 4 depicts a block diagram of data flow within system 100 for generating and implementing new calibration TRCs 314 for recalibration operations according to the disclosed embodiments. In printing systems, recalibration may occur after initial calibration on printing devices. If the recalibration is successful, system 100 will use the new measurement data and generate a TRC per typical calibration behavior. System 100, however, may generate multiple calibration TRCs 156, as disclosed above, from measurement data 122. These calibration TRCs may be stored at printing devices within system. As shown in FIG. 4, measurement data 122 is stored with calibration data set 310 at printing devices 104 and 140.

The disclosed embodiments update all calibration TRCs 156 using measurement data 122 after recalibration. Color management server 106 may identify calibration TRCs 156 among the printing devices that share measurement data 122. For each TRC 156, color management server 106 retrieves TRC settings 308 and generate new calibration TRCs 314, as disclosed above, using updated measurement data 402 captured during recalibration. Thus, edits 312 may include updated measurement data 402 as opposed to edited TRC settings.

Color management server 106 then replaces all identified TRCs 156 and measurement data 122 with new TRCs 314 and updated measurement data 402. This process may be repeated after subsequent recalibrations to update TRCs and capture new measurement data. Though not shown, test chart 116 may be used during recalibration. It also alleviates the need to perform recalibration operations on multiple printing devices. A single set of updated measurement data 402 may be used for all recalibration operations. The above processes are not performed for TRCs stored on printing device 142 as it does not have measurement data 122. TRC settings are not retrieved from printing device 142 or new TRCs received. An operator may need to perform normal recalibration operations on printing device 142.

The disclosed process of generating new calibration TRCs 314 in accordance with shared measurement data 122 also may be used on a printing device having multiple TRCs with the shared data. Thus, color management server 106 may obtain multiple TRC settings 308 from those TRCs 156 stored on the printing device. Alternatively, TRC settings 308 for multiple TRCs 156 may be stored at color management server 106 along with shared measurement data 122. Recalibration operations may result in new calibration TRCs 314 and updated measurement data 402 for any of these scenarios.

In some instances, recalibration may fail on a printing device that shares measurement data 122 with multiple TRCs 156. Color management server 106 will perform additional operations to update those TRCs associated with shared measurement data 122. It may identify calibration TRCs 156 that share measurement data 122, as disclosed above. Color management server 156 determines a pass or fail status 404 for identified calibration TRCs 156 using updated measurement data 402.

For those calibration TRCs 156 that fail, these may be edited using edits 312, as disclosed above. TRC settings 308 for the failed TRC may be edited. The settings may be adjusted by the operator, such as end point targets 304, that allow generation of TRCs that pass recalibration. Updated measurement data 402 then may be used to generate new TRCs 314 as disclosed above.

Color management server 106 may instruct the operator to adjust TRC settings 308 for the TRCs 156 that fail. In other words, the adjustments may be treated as edits 312, as disclosed above. Updated measurement data 402 may be captured and new calibration TRCs 314 may be generated. The disclosed embodiments may perform the recalibration operations to determine whether the new data and TRCs pass. Color management server 106 may be able to correct multiple TRCs with one set of updated measurement data 402.

In some embodiments, color management server 106 may offer the operator an option to automatically adjust all TRCs 156 to compensate for the failed recalibration. Color management system 106 may, for example, adjust all TRC settings 308 to redistribute settings in an even manner. The disclosed embodiments may do this even for those TRCs 156 that pass recalibration. Thus, color management server 106 may not need to identify those TRCs 156 that include measurement data 122. Using this example, TRCs 156 from printing device 142 may be included in adjustments made to TRC settings 308. Alternatively, color management server 106 may adjust all TRC settings 308 by the same amount so that absolute differences between new TRCs 314 are maintained.

For failed recalibration, the operator may recover to a pass status by performing a new calibration. Color management server 106 may generate test charts 116 and receive measurement data 122, as disclosed above. In this instance, however, color management server 106 may identify the TRCs 156 corresponding with measurement data 122 to go through calibration operations as opposed to just instructing new calibrations for all TRCs. It will retain information and data for TRC settings 308 and perform the same functions as editing TRCs 156 shown above. In other embodiments, color management server 106 may perform this action without requiring that the operator print or measure test chart 116. The recalibration measurement data, or updated measurement data 402, may be used. Thus, a new calibration is performed using recalibration data.

Figure 5:
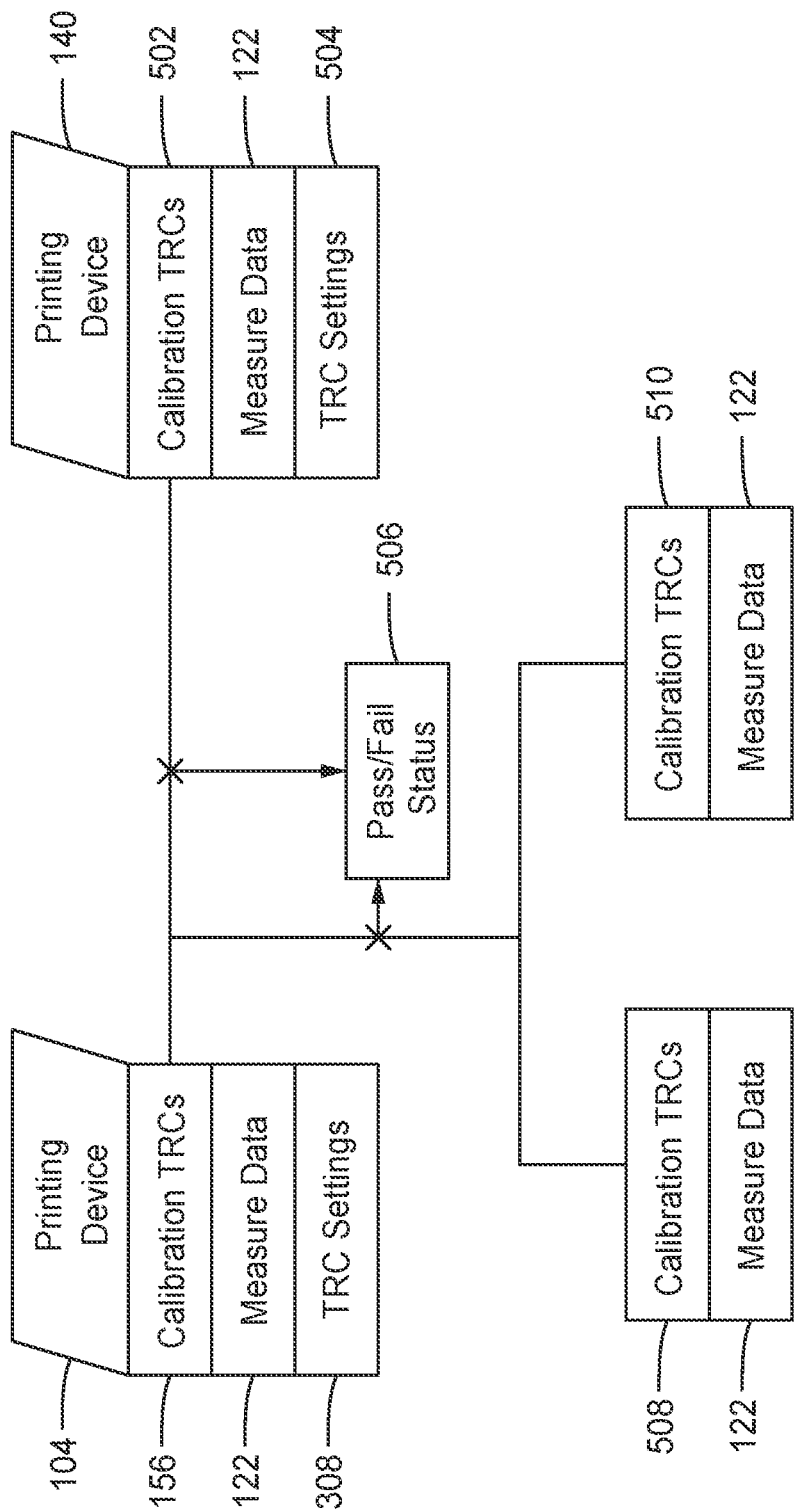
FIG. 5 illustrates a block diagram of a match calibration operation according to the disclosed embodiments.

FIG. 5 depicts a block diagram of a match calibration operation according to the disclosed embodiments. Match calibration is similar to recalibration operations disclosed above but is performed between two or more printing devices as opposed to recalibration that is done with the same printing device at two points in time. Printing device 104 includes calibration TRCs 156 that are associated with measurement data 122 and TRC settings 308. Printing device 140 includes calibration TRCs 502 that are associated with measurement data 122 and TRC settings 504. Thus, measurement data 122 ties the TRCs between the printing devices with each other.

During the match calibration operations, printing device 104 includes calibration TRCs 156. Printing device 140 performs a calibration operation to determine whether its response is the same as printing device 104. Printing device 140 may use measurement data 122 results in calibration TRCs 502 pass or fail as disclosed above. In other words, the calibration operations 140 may be treated as a recalibration operation for printing device 104. Match calibration pass/fail status 506 is determined for the comparison between TRCs 156 and 502. The TRCs may be different but they should match densities that are output at the printing devices using measurement data 122.

As shown in FIG. 5, calibration TRCs 156 from printing device 104 may be matched against multiple TRCs within system 100. These TRCs may be stored on other printing devices. Thus, the TRC group used for determining calibration status spans multiple printing devices. Calibration TRCs 508 and 510 also use measurement data 122. Calibration TRCs 508 and 510 are generated as disclosed above. Match calibration is performed between calibration TRCs 156 and calibrations 508 and 510 based on related measurement data 122. A pass/fail status 506 is determined for each set of calibration TRCs. For example, stable reproduction, or matched densities, may be achieved between calibration TRCs 156 and calibration TRCs 508 but not so for TRCs 156 and TRCs 510. Thus, status 506 for calibration TRCs 508 is pass while status 506 for calibration TRCs is fail. The disclosed embodiments then may take action similar to those associated with failed recalibration operations.

Match calibration may be performed in different manners. In some embodiments, printing device 104 may act as a source printing device within a centralized system. Calibration TRCs 156 of printing device 104 may be used to perform match calibration with other TRCs within system 100. Alternatively, match calibration may be performed in a peer-to-peer manner. Match calibration may occur between TRCs 156 and 502, then TRCs 502 to 508, and so on. System 100 tracks the match calibrations to identify those TRCs that fail. Further, match calibration may cover not just calibration that matches TRCs but a TRC group that matches another TRC group. For example, TRCs 156 and 502 may be matched against TRCs 508 and 510 to determine a pass/fail status 506 for the second group.

The disclosed embodiments also provide for shared profile settings for TRC groups or part of a match calibration. FIG. 5 shows TRC settings 308 for calibration TRCs 156. System 100 may enable the sharing of TRC settings 308 between printing devices. Thus, printing device 104 may share TRC settings 308 with printing device 140 as TRC settings 504. A primary TRC setting may be an end point target. This setting is a percentage value that defines the maximum density for the printing device in color printing operations. A secondary TRC setting may be the aims for the TRC.

When shared TRC settings are enabled, the TRCs from printing device 104 are distributed to all printing devices that match printing device 104. Thus, if TRC settings 308 are being shared with printing device 140, then TRCs 156 may be distributed to printing device 140. In addition, the values for TRCs 156 also are distributed to printing device 140. Printing device 140 may convert the percentage values for the end point targets and aims of TRC settings 308 into absolute density values that are based on the unique measurement data for the printing device. In other words, the absolute density values related to TRC settings 308 may be used in conjunction with the unique measurement data, which is not measurement data 122, at printing device 140 to generate TRC settings 504 that are "shared" with TRC settings 308.

The disclosed embodiments also may use calibration status, such as status 404 or status 506, of which the TRCs that pass and fail are noted. As disclosed above, if recalibration fails, then color management server 106 will automatically evaluate all TRCs in a group having related measurement data 122. Color management server 106 may determine the TRCs are still good and those that have failed. In other words, status for calibrations are determined that were not directly measured. Match calibration may be used in performing these evaluations.

Similarly, if calibration fails, then all calibrations that match the failed calibration also are evaluated to determine whether which of the calibrations pass and fail. Match calibration may be performed downstream to determine status 506 for TRCs. These two processes may be combined so that once a calibration fails, then the local calibration group status is updated and then the downstream calibration status group is updated. Status updates also may be percolated based on calibration editing or based on recovering via an initial or updated calibration. System 100 or color management server 106 also may use the calibration status to either warn or prevent print jobs when calibration fails.

Calibration status, such as when a TRC 156 fails calibration, has a direct impact on ICC profile status. Referring back to FIG. 1, TRCs 156 may be associated with ICC profile 157. If there is a problem with a calibration, then the status, such as fail, as well as any warnings or preventing of printing also is applied to ICC profile 157. Thus, the calibration and the ICC profile statuses are conjoined. An alert may be sent for associated ICC profile 157 when calibration or recalibration fails.

In FIGS. 1-5, color management server 106 is disclosed that manages many of the functions associated with the disclosed embodiments. It should be noted that color management server 106 may be incorporated in a printing device, such as printing device 104 so that this device manages color printing resources within system 100. Further, different components within system 100 may perform the disclosed processes without the use of a dedicated server. Color management server 106 is cited and disclosed as the component that manages resources within system 100 for color printing.

Figure 6:
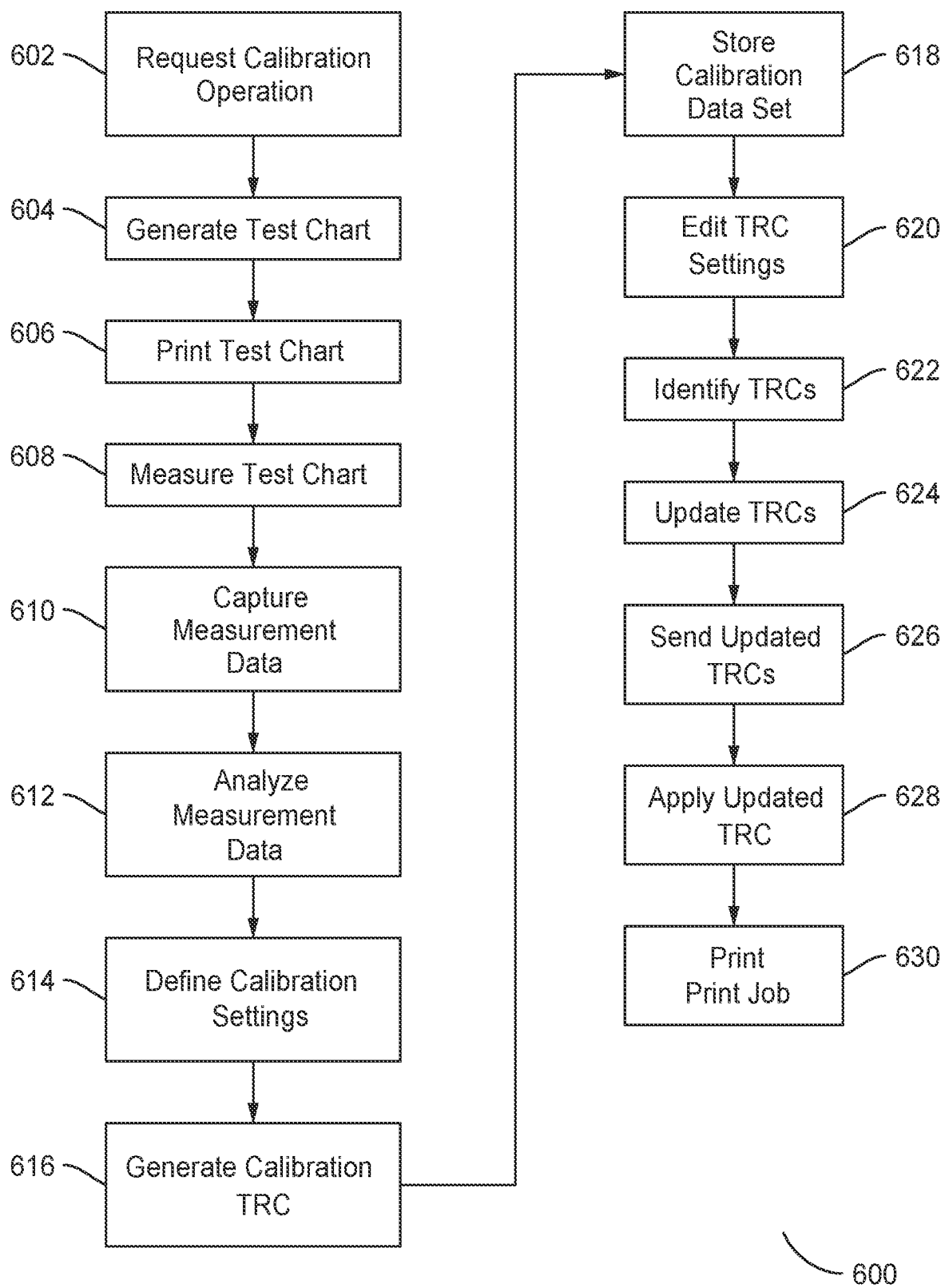
FIG. 6 illustrates a flowchart for managing color management resources using measurement data and TRC settings according to the disclosed embodiments.

FIG. 6 depicts a flowchart 600 for managing color management resources using measurement data 122 and TRC settings 308 according to the disclosed embodiments. Flowchart 600 may refer to FIGS. 1-5 for illustrative purposes. The embodiments disclosed by flowchart 600, however, are not limited by FIGS. 1-5.

Step 602 executes by requesting a calibration operation to be performed for managing color printing resources within system 100. Request 103 may be received at color management server 106 to perform and oversee the calibration operation. Step 604 executes by generating test chart 116 for the calibration operation. Test chart 116 may include color patches for the colors of interest in the calibration, such as cyan, magenta, yellow, and black. Test chart 116 is sent to one or more printing devices, such as printing device 104.

Step 606 executes by printing test chart 116 at printing device 104. Test chart 116 may be printed on a specified paper media set forth by the calibration operation. The printed document includes the color patches with colorant ramps used to define the TRC for each colorant. Step 608 executes by measuring test chart 116. The color patches, for example, are scanned using color measurement tool 108 to capture the printed color parameters. Step 610 executes by capturing measurement data 122 from color measurement tool 108. Measurement data 122 also may be known as calibration data.

Step 612 executes by analyzing measurement data 122. Preferably, measurement data 122 is sent from printing device 104 to color management server 106. Color management server 106 analyzes the data to complete calibration operations. Step 614 executes by defining calibration settings 302 for the calibration operations. Calibration settings 302 may include end point targets 304 and aims 306. Step 614 may be executed at any time before this step. For example, calibration settings 302 may be defined by the operator when requesting the calibration operation be done or when generating test chart 116.

Step 616 executes by generating a calibration TRC 156 using measurement data 122 and calibration settings 302. TRC settings 308 also are generated and associated with the calibration TRC and measurement data 122. This information may be known as calibration data set 310. In some embodiments, more than one TRC 156 is generated and associated with TRC settings 308 and measurement data 122. Step 618 executes by storing calibration data set 310, which includes calibration TRC 156, TRC settings 308, and measurement data 122. In some embodiments, calibration data set 310 is stored at color management server 106 as well as at printing device 104. In other embodiments, calibration data set 310 is stored on printing device 104 and retrieved as needed by color management server 106.

Step 620 executes by editing TRC settings 308. TRC settings 308 may be edited at any time. For example, TRC settings 308 may receive edits 312 after printing test chart 116 as the calibration target. Edits 312 to TRC settings 308 may be received after generation of TRC 156 or after installation in printing device 104. For example, an end point target 304 may be edited, which will impact TRCs generated using TRC settings 308.

Step 622 executes by identifying calibration TRC or TRCs 156 associated with measurement data 122 corresponding to edited TRC settings 308. For example, TRCs 156 generated using measurement data 122 may be found in other printing devices within system 100. Multiple TRCs may be stored on printing device 104. The common feature is the use of measurement data 122 to generate the TRCs. Step 624 executes by updating calibration TRCs with the edited TRC settings to generate new TRCs 314. Using the above example, TRC 156 with measurement data 122 is identified by color management server 106. Edited TRC setting 308 is used to generate new TRC 314 using measurement data 122. Another calibration operation is not needed.

Step 626 executes by sending new, or updated, TRC or TRCs 314 to printing device 104. As noted above, a plurality of TRCs 156 may be associated with measurement data 122 and identified to be updated with edited TRC settings 308. All of these TRCs are updated to generate new TRCs 314. The TRCs may be implemented by multiple printing devices within system 100. Step 628 executes by applying updated TRC 314 in color printing operations. The new TRC replaces the older, or original, TRC 156. The parameters specified by edited TRC settings 308 are enforced. Step 630 executes by printing a print job at printing device 104 to produce a color document according to updated TRC 314.

Figure 7:
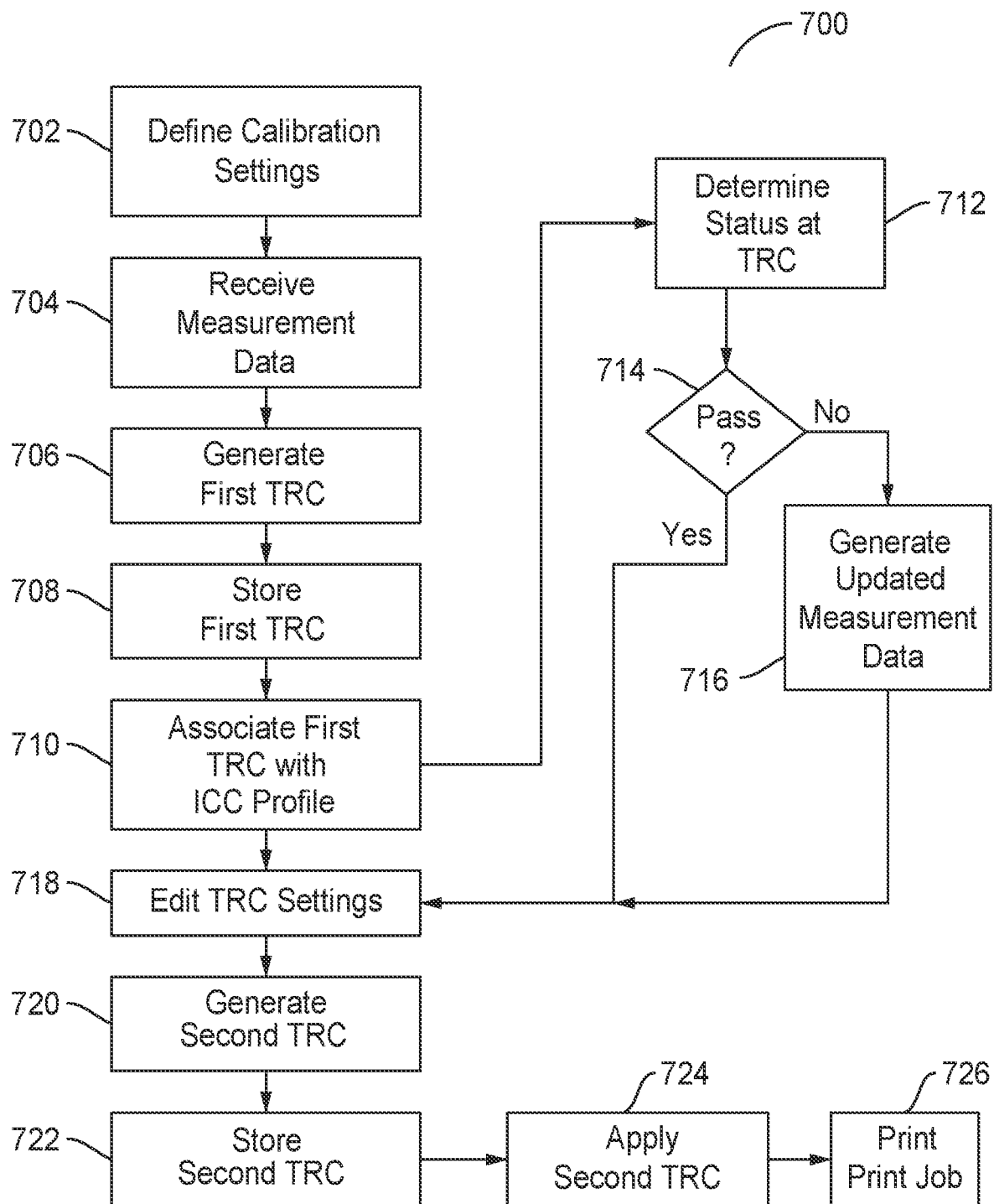
FIG. 7 illustrates a flowchart for managing color printing resources at a printing device according to the disclosed embodiments.

FIG. 7 depicts a flowchart 700 for managing color printing resources at printing device 104 according to the disclosed embodiments. Flowchart 700 may refer to FIGS. 1-6 for illustrative purposes. The embodiments disclosed by flowchart 700, however, are not limited by FIGS. 1-6.

Step 702 executes by defining calibration settings 302 for a calibration that captures measurement data 122, as disclosed above. Calibration settings 302 may be for printing device 104 and include end point targets 304 and aims 306. Step 704 executes by receiving measurement data 122 associated with calibration settings 302. Measurement data 122 may be received at color management server 106, or, alternatively, "received" at printing device 104, which captured the measurement data.

Step 706 executes by generating a first calibration TRC 156 based on calibration settings 302 and measurement data 122. TRC settings 308 for first TRC 156 also are generated. Step 708 executes storing the first TRC 156, TRC settings 308, and measurement data 122. These components may be shown as calibration data set 310 in FIG. 3. Calibration data set 310 may be stored at printing device 104. It also may be stored at other printing devices within system 100. Step 710 executes by associating first TRC 156 with ICC profile 157. ICC profile 157 may be built on top of calibrated output from first TRC 156.

Step 712 executes by determining a status 404 for first TRC 156. Status 404 may be a pass or fail status based on a recalibration operation. Alternatively, no recalibration may be performed and the disclosed embodiments just determine that first TRC 156 still applies to a certain paper media or other criteria. If first TRC 156 fails a calibration quality check for any reason, then the disclosed embodiments may take further action to recalibrate or update the TRC and TRC settings to allow a printing device to pass calibration.

Step 714 executes by determining whether status 404 for first TRC 156 is a pass status. If yes, then flowchart 700 proceeds to step 718 to allow edits to TRC settings 308, as disclosed above. If step 714 is no, then step 716 executes by generating updated measurement data 402. Calibration may be performed at printing device 104 to capture updated measurement data 402. If first TRC 156 fails recalibration, then step 716 may be executed to update the TRCs associated with original measurement data 122.

Step 718 executes by editing TRC settings 308 associated with measurement data 122. The disclosed embodiments may identify those TRCs related to first TRC 156 and measurement data 122 as well as the TRC settings. Step 720 executes by generating second TRC 314 based on the edited TRC settings and measurement data 122 or updated measurement data 402. Step 722 executes by storing second TRC 314. In some embodiments, first TRC 156 is replaced by second TRC 314 for color printing operations as specified. Step 722 also may replace measurement data 122 by updated measurement data 402, if applicable.

Step 724 executes by applying second TRC 314 for a color printing operation. A color print job may be received that specifies the second TRC be applied for color printing, such as a certain paper media and the like. Step 726 executes by printing the color print job at printing device 104.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing color management resources, the method comprising:
defining calibration settings for a printing device, wherein the calibration settings are associated with calibration measurement data captured at the printing device;
generating a first calibration tone reproduction curve (TRC) having TRC settings including end point targets (EPTs) using the calibration settings and the calibration measurement data;
storing a calibration data set at a color management server, the calibration data set including the first calibration TRC, the TRC settings, and the calibration measurement data captured at the printing device;
installing the first calibration TRC at the printing device;
determining at the color management server that the first calibration TRC failed a calibration operation at the printing device;
sending an instruction from the color management server to edit an end point target for the first calibration TRC;
editing the end point target of the EPTs for the first calibration TRC;
retrieving the calibration measurement data from the calibration data set associated with the TRC settings including the end point target;
updating the first calibration TRC based on the end point target and the calibration measurement data from the calibration data set; and
applying the first calibration TRC when processing a print job at the printing device.

2. The method of claim 1, further comprising printing a calibration target having a test chart.

3. The method of claim 2, further comprising measuring the test chart of the calibration target to obtain the calibration measurement data.

4. The method of claim 1, further comprising generating a second calibration TRC associated with the calibration measurement data corresponding to the end point target.

5. The method of claim 4, further comprising updating the second calibration TRC based on the end point target.

6. The method of claim 5, further comprising replacing the first calibration TRC with the second calibration TRC.

7. A method for managing color printing resources, the method comprising:
defining calibration settings, wherein the calibration settings are associated with calibration measurement data captured at a printing device;
generating a first calibration tone reproduction curve (TRC) having TRC settings including end point targets (EPTs) using the calibration settings and the calibration measurement data;
storing a calibration data set at a color management server, the calibration data set including the first calibration TRC, the TRC settings, and the calibration measurement data measured at the printing device;

installing the first calibration TRC at the printing device;

determining at the color management server that the first calibration TRC failed a calibration operation at the printing device;

sending an instruction from the color management server to edit an end point target for the first calibration TRC;

editing the end point target of the EPTs for the first calibration TRC;

retrieving the calibration measurement data from the calibration data set associated with the TRC settings including the end point target;

generating a second calibration TRC based on the end point target and the calibration measurement data from the calibration data set, wherein the second calibration TRC is associated with the TRC settings and the calibration measurement data; and applying the second calibration TRC when processing a print job at the printing device.

8. The method of claim 7, further comprising printing a calibration target having a test chart; and measuring the test chart of the calibration target to obtain the calibration measurement data.

9. The method of claim 7, further comprising sending the second calibration TRC to the printing device.

10. The method of claim 7, further comprising generating new calibration measurement data and new TRC settings that are associated with the second calibration TRC.

11. The method of claim 7, further comprising determining that a recalibration of the printing device fails according to the second calibration TRC.

12. The method of claim 7, further comprising associating an ICC profile corresponding to the first calibration TRC.

13. A color management server for a printing system configured to define calibration settings for a printing device within the printing system, wherein the calibration settings are associated with calibration measurement data;

generate a first calibration tone reproduction curve (TRC) having TRC settings including end point targets (EPTs) using the calibration settings and the calibration measurement data;

store a calibration data set, wherein the calibration data set includes the first calibration TRC, the TRC settings and the calibration measurement data measured at the printing device;

install the first calibration TRC at the printing device;

determine that the first calibration TRC failed a calibration operation at the printing device;

send an instruction to edit an end point target for the first calibration TRC;

edit the end point target of the EPTs for the first calibration TRC;

retrieve the calibration measurement data from the calibration data set associated with the TRC settings included the end point target;

update the first calibration TRC based on the end point target and the calibration measurement data from the calibration data set; and send the first calibration TRC to the printing device.

14. The color management server of claim 13, further configured to instruct the printing device to print a calibration target having a test chart; and receive the calibration measurement data obtained by measuring the test chart of the calibration target.

15. The color measurement server of claim 13, further configured to generate a replacement calibration TRC based on the edited TRC settings.

16. The color measurement server of claim 15, further configured to replace the first calibration TRC with the replacement calibration TRC.

* * * * *